United States Patent
Hanschmann et al.

(10) Patent No.: US 12,179,293 B2
(45) Date of Patent: Dec. 31, 2024

(54) FIXTURE ASSEMBLY FOR SUPPORTING BLANKS DURING SHEARING AND WELDING OPERATIONS

(71) Applicant: MAGNA INTERNATIONAL INC., Aurora (CA)

(72) Inventors: Florian Hanschmann, Perchtoldsdorf (AT); Anastasiia Makhaeva, Fohrenau (AT)

(73) Assignee: MAGNA INTERNATIONAL INC., Aurora (CA)

( * ) Notice: Subject to any disclaimer, the term of this patent is extended or adjusted under 35 U.S.C. 154(b) by 418 days.

(21) Appl. No.: 17/772,293

(22) PCT Filed: Nov. 3, 2020

(86) PCT No.: PCT/CA2020/051492
§ 371 (c)(1),
(2) Date: Apr. 27, 2022

(87) PCT Pub. No.: WO2021/087604
PCT Pub. Date: May 14, 2021

(65) Prior Publication Data
US 2022/0388101 A1 Dec. 8, 2022

Related U.S. Application Data

(60) Provisional application No. 62/930,684, filed on Nov. 5, 2019.

(51) Int. Cl.
*B23Q 3/00* (2006.01)
*B23K 26/242* (2014.01)
(Continued)

(52) U.S. Cl.
CPC ........ *B23K 37/0443* (2013.01); *B23K 26/242* (2015.10); *B23K 26/38* (2013.01)

(58) Field of Classification Search
CPC ... B23Q 3/00; B23Q 3/06; B23Q 1/25; B23Q 1/03; B23K 37/0443; B23K 26/242
See application file for complete search history.

(56) References Cited

U.S. PATENT DOCUMENTS 4,239,196 A * 12/1980 Hanger ................ B25H 1/0007
269/17
7,448,606 B1 * 11/2008 Johnson .............. B05B 13/0285
269/16
(Continued)

FOREIGN PATENT DOCUMENTS

CN 103157902 A 6/2013
CN 106736141 A 5/2017
(Continued)

OTHER PUBLICATIONS

Chinese Office Action dated May 13, 2023.
European Search Report for EP 20885202.0 dated Nov. 28, 2023.

*Primary Examiner* — Lee D Wilson
(74) *Attorney, Agent, or Firm* — Dickinson Wright PLLC (57) ABSTRACT

A fixture assembly for supporting a plurality of blanks during a shearing and welding operation. The fixture assembly includes a base frame. A rotating frame is rotatably connected to the base frame. A fixed block is fixed to the rotating frame for supporting a first blank. A moveable block is moveably connected to the rotating frame for supporting a second blank. A first clamp is provided for coupling the first blank to the fixed block. A second clamp is provided for coupling the second blank to the moveable block. A vertical actuator is coupled with the rotating frame and configured to move the moveable block in a vertical direction being perpendicular to a plane of the rotating frame for moving the second blank. A horizontal actuator is coupled with the rotating frame and configured to move the moveable block in a horizontal direction.

20 Claims, 8 Drawing Sheets

(51) Int. Cl.
    *B23K 26/38*     (2014.01)
    *B23K 37/04*     (2006.01)

(56)     References Cited

U.S. PATENT DOCUMENTS

| | | | |
|---|---|---|---|
| 7,950,635 B2 * | 5/2011 | Proehl | B05B 13/0285 |
| | | | 248/676 |
| 11,066,188 B2 * | 7/2021 | Lofstrom | B64C 27/473 |
| 2002/0000429 A1 | 1/2002 | Delle Piane et al. | |
| 2004/0055147 A1 | 3/2004 | Ghuman et al. | |
| 2019/0022808 A1 * | 1/2019 | Tsui | B23Q 1/621 |
| 2022/0388101 A1 * | 12/2022 | Hanschmann | B23K 26/08 |

FOREIGN PATENT DOCUMENTS

| | | |
|---|---|---|
| CN | 208977138 U | 6/2019 |
| CN | 209125190 U | 7/2019 |
| JP | S59185074 U | 12/1984 |
| JP | H09136188 A | 5/1997 |
| JP | 2012148332 A | 8/2012 |
| JP | 2013237057 A | 11/2013 |

\* cited by examiner

FIXTURE ASSEMBLY FOR SUPPORTING BLANKS DURING SHEARING AND WELDING OPERATIONS

CROSS-REFERENCE TO RELATED APPLICATIONS

This U.S. National Stage Patent Application claims the benefit of PCT International Patent Application Serial No. PCT/CA2020/051492 filed Nov. 3, 2020 entitled "FIXTURE ASSEMBLY FOR SUPPORTING BLANKS DURING SHEARING AND WELDING OPERATIONS" which claims the benefit of and priority to U.S. Provisional Patent Application Ser. No. 62/930,684 filed on Nov. 5, 2019, and titled "Fixture Assembly For Supporting Blanks During Shearing And Welding Operations," the entire disclosure of which is hereby incorporated by reference.

BACKGROUND OF THE INVENTION

1. Field of the Invention

A fixture assembly for supporting two or more blanks to one another during shearing and welding operation. More particularly, a fixture assembly that is horizontally, vertically and rotatably adjustable to allow a plurality of blanks to be sheared and welded in one sequence without having to unclamp and readjust the blanks.

2. Description of the Prior Art

Laser welding is known in manufacturing as an efficient and effective method of connecting two or more blanks, i.e., work pieces, to one another. Typically, a fixture assembly is provided for securing the blanks into a desired position during the laser welding operation. The desired position typically includes two or more surfaces of the blanks disposed in alignment with one another such that the union between the blanks may be welded. Conventional fixture assemblies typically utilize a series of clamps for holding the blanks in place. An issue with such fixture assemblies is that minor variations in blank dimensions can cause the blanks to be misaligned with one another once they are clamped in place, thus creating gaps that cannot be laser welded without adding additional material, e.g., filler wire. Accordingly, excess time and materials are often required to execute a successful laser welding operation.

It is also known to shear one or more of the blanks prior to being welded in order to provide a desired size and/or shape of the blank and to provide reduced weight of the final component. In some cases, shearing can provide a rough/burred edge which can further create gaps between the blanks, which can be difficult to bridge during laser welding without added filler. Furthermore, the additional step of shearing provides increased cycle time and costs, especially since the blanks typically have to be unclamped and relocated multiple times prior to welding. Accordingly, there remains a need for improvements to such fixture assemblies.

SUMMARY OF THE INVENTION

A fixture assembly for supporting a plurality of blanks during a shearing and welding operation. The fixture assembly includes a base frame. A rotating frame is rotatably connected to the base frame. A fixed block is fixed to the rotating frame for supporting a first blank of the plurality of blanks. A moveable block is moveably connected to the rotating frame for supporting a second blank of the plurality of blanks. At least one first clamp is provided for coupling the first blank to the fixed block. At least one second clamp is provided for coupling the second blank to the moveable block. A vertical actuator is coupled with the rotating frame and configured to move the moveable block in a vertical direction being perpendicular to a plane of the rotating frame for moving the second blank into a desired vertical position. A horizontal actuator is coupled with the rotating frame and configured to move the moveable block in a horizontal direction being perpendicular to the vertical direction for moving the second blank into a desired horizontal position.

According to another aspect of the disclosure, a method for supporting and locating a plurality of blanks during a shearing and welding operation with a fixture assembly is provided. The method includes coupling a first blank of the plurality of blanks to a fixed block of the fixture assembly. The method also includes coupling a second blank of the plurality of blanks to a moveable block of the fixture assembly. The method also includes moving the moveable block with a vertical actuator such that the second blank is in a first vertical position in which the second blank is vertically above the first blank. The method also includes moving the moveable block with a horizontal actuator such that the second blank is in a first horizontal position in which the first blank horizontally overlies the second blank along an overlying region. The method also includes shearing the first and second blanks along the overlying region such that an edge of the first blank is horizontally aligned with an edge of the second blank. The method also includes vertically moving the moveable block with the vertical actuator such that the first blank is at least partially vertically aligned with the second blank at an intersection region. The method also includes welding the first blank to the second blank at the intersection region.

The fixture assembly is advantageously able to secure the blanks to the fixed and moveable blocks, and move the moveable block with the rotating frame and vertical and horizontal actuators as needed during shearing and welding operations with only a single clamping action from the first and second clamps. In other words, the entire shearing and welding process may be conducted without unclamping and manually moving the blanks. Accordingly, decreased cycle times may be provided, as the blanks do not need to be released from the clamps to manipulate their positions. Furthermore, a reduced mass of the final products, especially in multi-gauge, complex products can be provided, as the blanks can conveniently be sheared into smaller segments while being supported by the single clamping action of the first and second clamps. Furthermore, improved edge quality can be provided on the blanks prior to welding because the blanks can be sheared while overlying one another, and subsequently vertically moved to align the edges with one another, thereby providing a substantially flush union between the blanks. This eliminates the need for filler materials between the blanks, even when the blanks have dimensional imperfections or are not clamped in perfect alignment. The blanks may be sheared during this step in various patterns, e.g., a waves, zig-zag, while still providing a substantially flush union between the blanks after shearing. Furthermore, because the rotating frame can be rotated, the blanks can be rotated 180 degrees after shearing to allow the weld to be located along a burr edge after the blanks are sheared, thus utilizing the burr material to provide a smoother weld slope.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a fixture assembly 10 for supporting a plurality of blanks during shearing and welding operations is generally shown. According to the example embodiment, the blanks are sheets of steel, however, it should be appreciated that various types of blanks may be sheared and welded with the subject fixture assembly, and the blanks may be coated or uncoated. Furthermore, according to the example embodiment, laser shearing and laser welding methods are employed, however, it should be appreciated that the fixture assembly 10 may be used in conjunction with other types of shearing and welding systems.

With reference to FIGS. 1-4, the fixture assembly 10 includes a generally rectangular shaped base frame 12. The base frame 12 has a pair of side members 14 that extend parallel to one another, and a pair of end members 16 that extend between ends of the side members 14 and parallel to one another. Four corners 18 are located at the intersections of the side members 14 and the end members 16. A plurality of legs 20 each extend downwardly from one of the corners 18 of the base frame 12 for supporting the base frame 12 on a supporting surface such as a welding table or ground. A pair of fork brackets 21 extend from the side members 14 for allowing the fixture assembly 10 to be moved with a fork lift.

A pair of generally triangular shaped support members 22 each extend upwardly from one of the end members 16. A generally rectangular-shaped rotating frame is 24 rotatably supported between the support members 22. More particularly, the rotating frame 24 has a pair of outside members 26 that extend parallel with one another, and a pair of edge members 28 that extend between ends of the outside members 26 and parallel to one another. Each of the outside members 26 is rotatable relative to the support members 22 along an axis A. A rotation actuator 30 interconnects one of the outside members 26 and one of the support members 22. The rotation actuator 30 selectively provides the rotating movement of the rotating frame 24 about the axis A. As will be discussed in further detail below, because the rotating frame 24 is capable of rotating, it provides access to bottom surfaces of the blanks during both shearing and welding operations.

A first central member 32 and a second central member 34 extend between the outside members 36 of the rotating frame 24 in parallel relationship with the edge members 28. A fixed block 36 is connected to the first central member 32 for supporting a first blank 38 of the plurality of blanks. According to the example embodiment, the fixed block 36 is magnetic for drawing the first blank 38 to the fixed block 36 to secure the first blank 38 relative to the fixed block 36. A moveable block 40 is moveably connected to the second central member 34 for adjustably supporting a second blank 42 of the plurality of blanks. According to the example embodiment, the moveable block 40 is also magnetic for drawing the second blank 42 to the moveable block 40 to secure the second blank 42 relative to the moveable block 40. It should be appreciated however, that the fixed and moveable blocks 36, 40 could be made of non-magnetic materials. It should also be appreciated that the first and second blocks may each be configured to hold more than one blank.

A pair of first clamps 44 are connected to the first central member 32. The first clamps 44 are configured to clamp the first blank 38 to the fixed block 36. A pair of second clamps 46 are connected to the second central member 34. The second clamps 36 are configured to clamp the second blank 42 to the moveable block 40. According to the example embodiment, the first and second clamps 44, 46 are adjusted by pneumatic cylinders, however other types of manual or automatic actuators could be employed to adjust the first and second clamps 44, 46. It should be appreciated that in order to provide flexibility in operations any number of first and second clamps 44, 46 may be used to hold any number of blanks, and the pair of first clamps 44 may together hold a single blank, and likewise the pair of second clamps 46 may be used to hold a single blank.

A vertical actuator 48 is coupled with the second central member 34 and configured to move the moveable block 40 in a vertical direction that is perpendicular to a plane of the rotating frame 24 for moving the second blank 42 into a desired vertical position. A horizontal actuator 50 is coupled with one of the edge members 28 of the rotating frame 24 and configured to move the moveable block 40 in a horizontal direction that extends between the edge members 28 for moving the second blank 42 into a desired horizontal position. According to the example embodiment, the vertical and horizontal actuators 48, 50 are pneumatic cylinders, however other types of actuators could be employed. A pressure sensor 52 is coupled with one of the edge members 28 of the rotating frame 24 and configured to detect a pressure of the horizontal and/or vertical actuators 48, 50 against the moveable block 40 in order to monitor locations of the first and second blanks 38, 42 and to avoid a deflection of the blanks 38, 42 as a result of too much pressure applied thereto.

The rotation actuator 30, vertical actuator 48 and horizontal actuator 50 are electrically connected with a controller 54 for controlling actuation of the same. The pressure sensor 52 is also electrically connected to the controller 54 for receiving inputs indicating pressures applied to the blanks 38, 42 and the controller 54 is configured to actuate the rotation actuator 30, vertical actuator 48 and horizontal actuator 50 in response to the received inputs.

Figure 3:
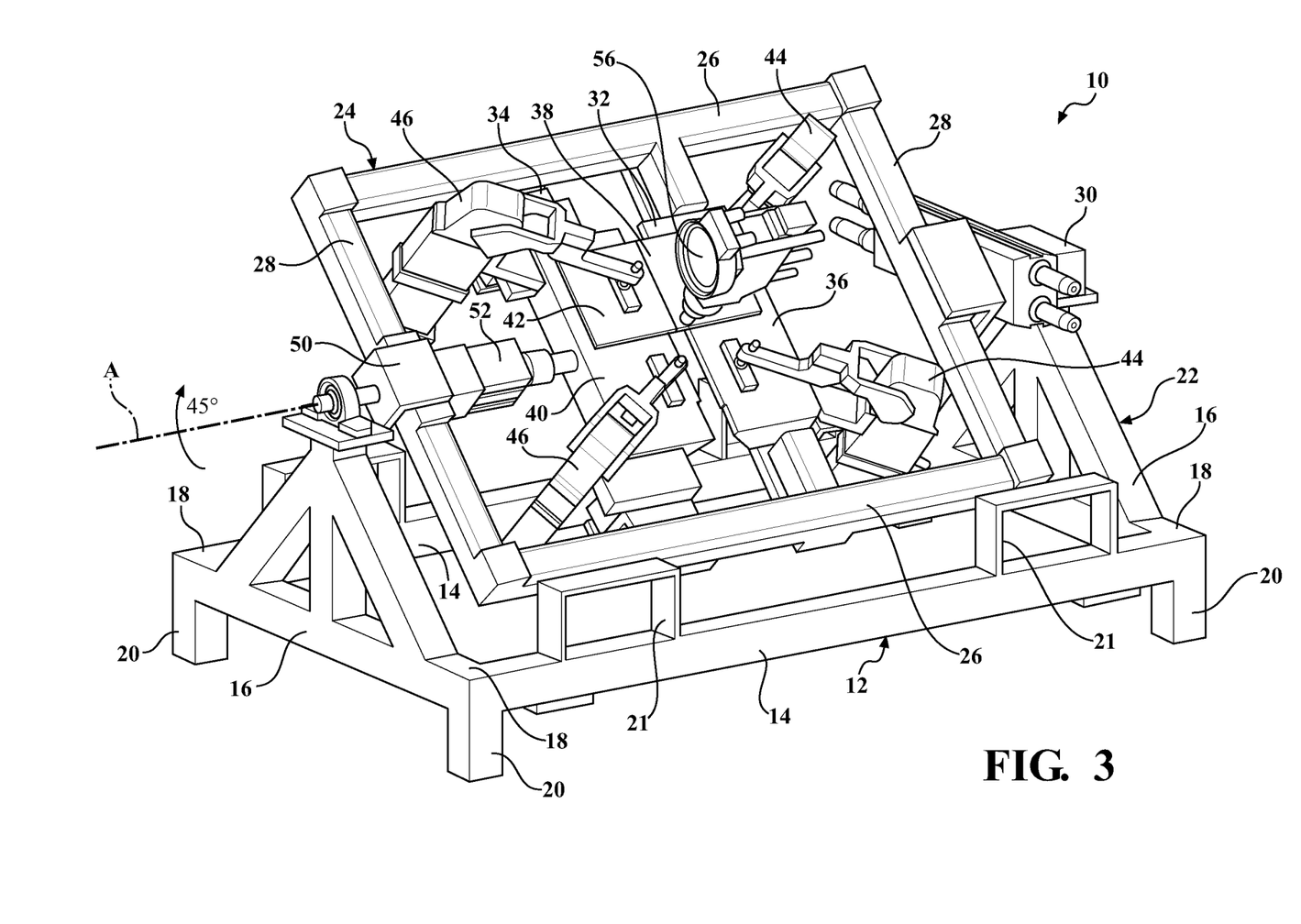
FIG. 3 is a perspective view of the fixture assembly with a rotating frame rotated 45 degrees.
Figure 3A:
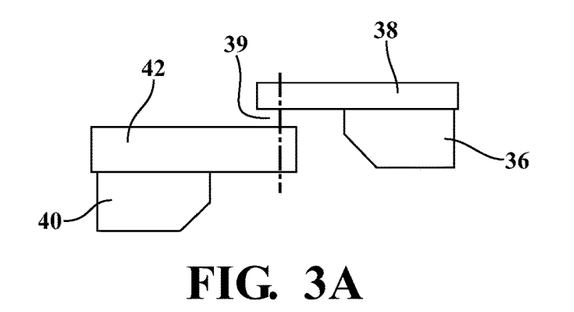
FIG. 3A is a side view of blanks secured to fixed and moveable blocks of the fixture assembly during a shearing operation.
Figures 4, 4A, 4B:
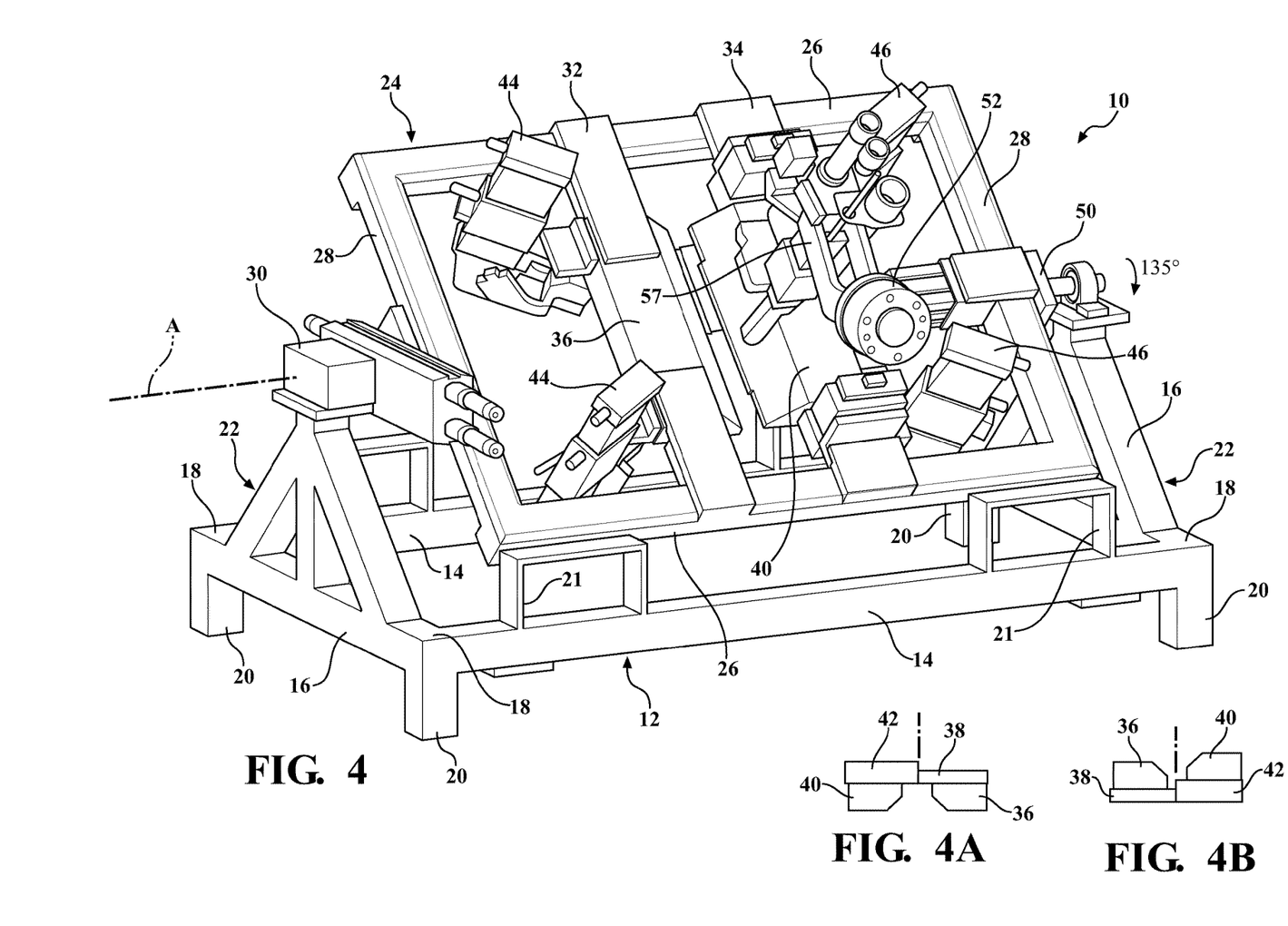
FIG. 4 is a perspective view of the fixture assembly with the rotating frame rotated 135 degrees.
FIG. 4A is a side view of blanks secured to the fixed and moveable blocks with upper surfaces of the blanks exposed during a welding operation.
FIG. 4B is a side view of blanks secured to the fixed and moveable blocks with lower surfaces of the blanks exposed after rotation of the rotating frame during a welding operations.

As shown in FIG. 3 a laser cutting head 56 may be configured to shear the blanks 38, 42. As shown in FIG. 4, a laser welding head 57 may be used to weld the blanks 38, 42. Alternatively, a multifunctional laser head that is capable of both laser shearing and welding may be employed in conjunction with the subject fixture assembly 10. The laser and welding heads 56, 57 may be connected to the controller 54 to provide automatic movement of the same. The laser head 56 may also be manually controlled.

Figure 1:
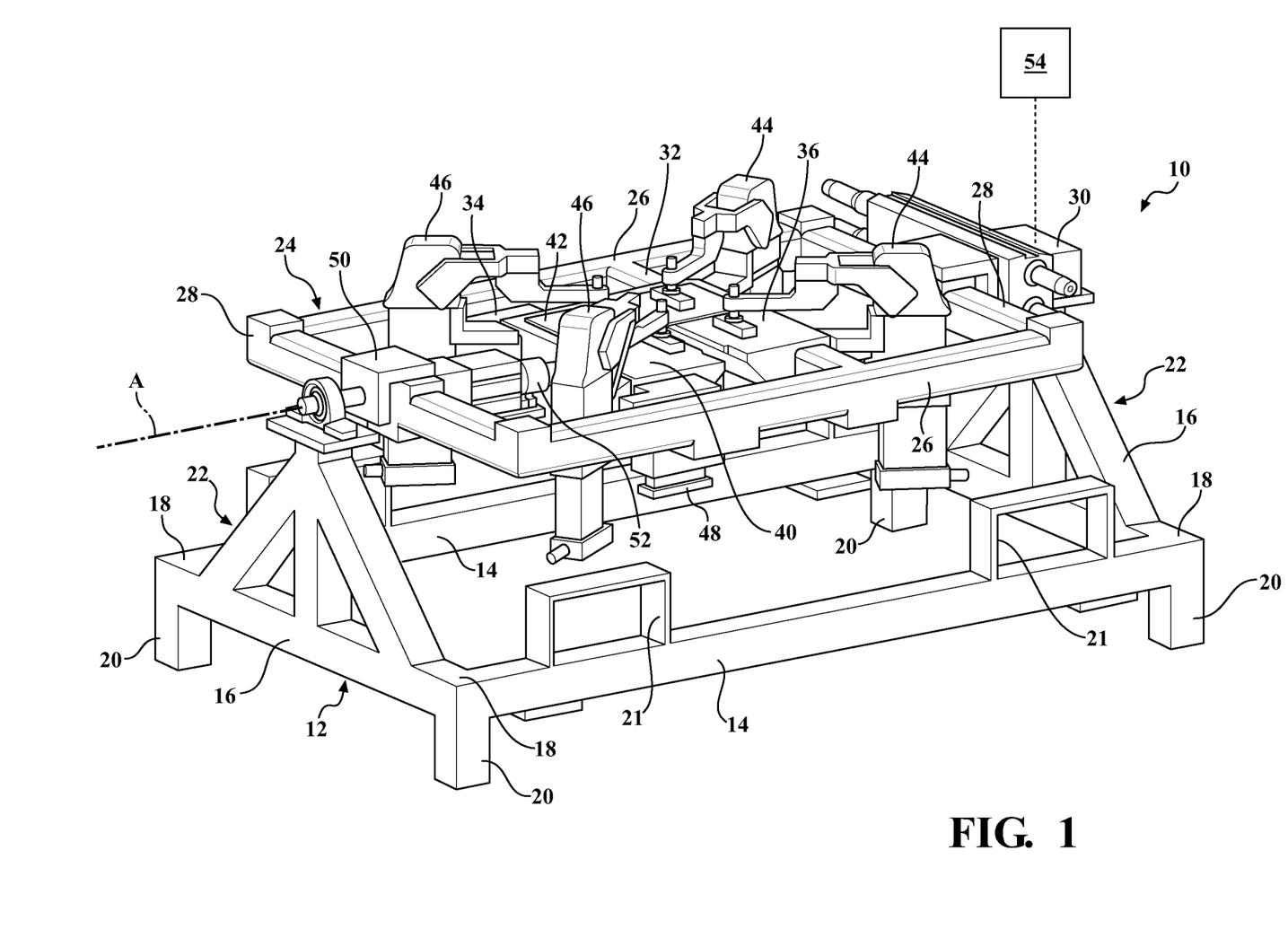
FIG. 1 is a perspective view of an example embodiment of a fixture assembly.
Figures 2, 2A, 2B:
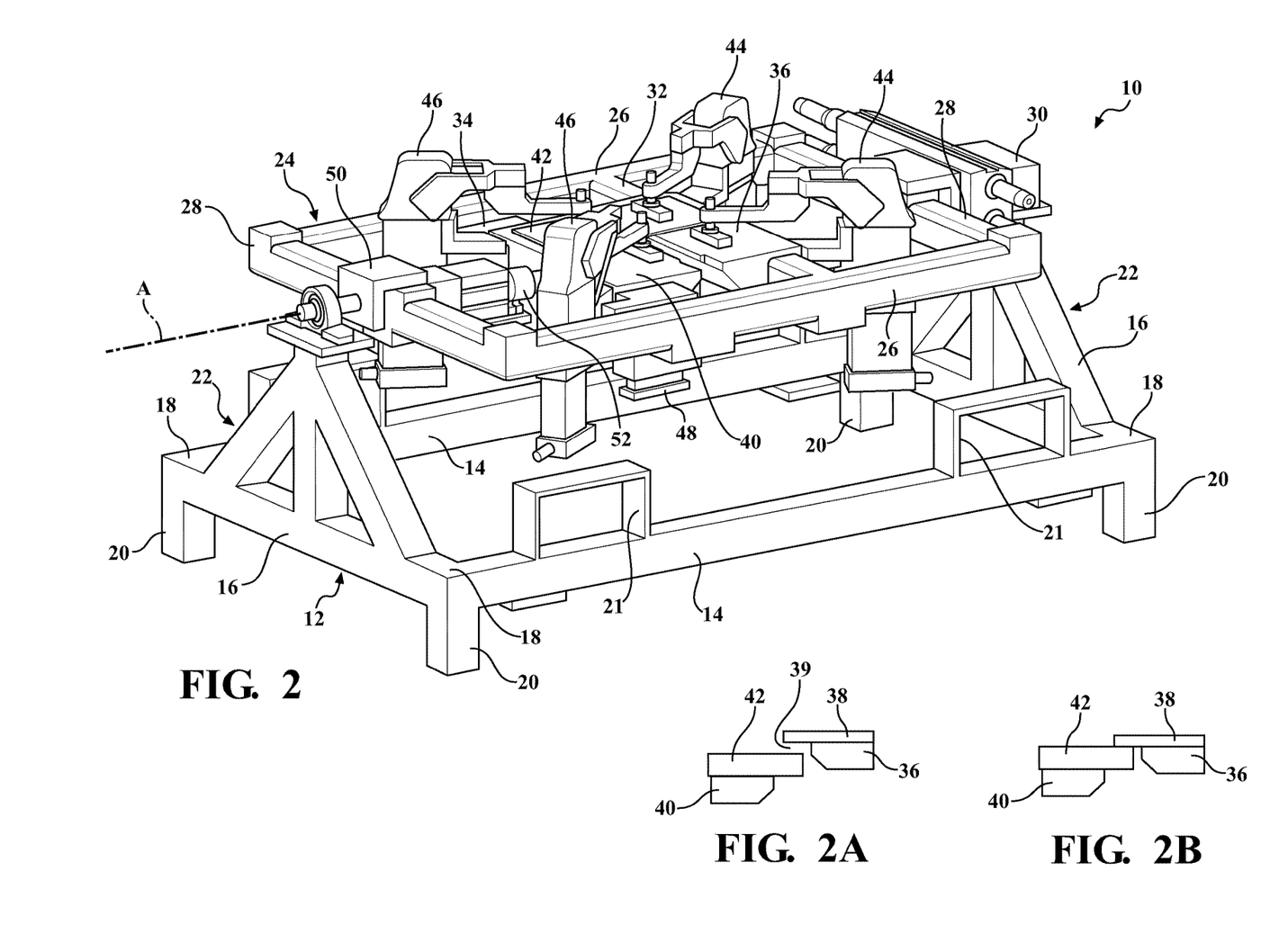
FIG. 2 is another perspective view of the example embodiment of the fixture assembly.
FIG. 2A is a side view of blanks secured to fixed and moveable blocks of the fixture assembly in a vertically spaced arrangement.
FIG. 2B is a side view of the blanks of FIG. 2A after the moveable block is vertically moved such that the blanks vertically engage one another.

FIGS. 2-2B and 5A-5D set forth a first example operation of the subject fixture assembly 10. As shown in FIGS. 2-2A, the process starts with securing the first blank 38 to the fixed block 36 with one of the first clamps 44, and securing the second blank 42 to the moveable block 40 with one of the second clamps 46, with a portion of the first blank 38 overlying the second blank 42 along an overlying region 39. In this case, the thicker second blank 42 is located on the moveable block 40, and the thinner first blank 38 is located on the fixed block 36.

Figure 5A:
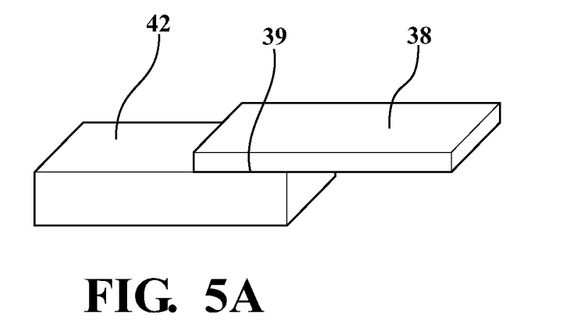
FIG. 5A is a perspective view of a first blank and a second blank, with the second blank overlying the first blank.
Figure 5D:
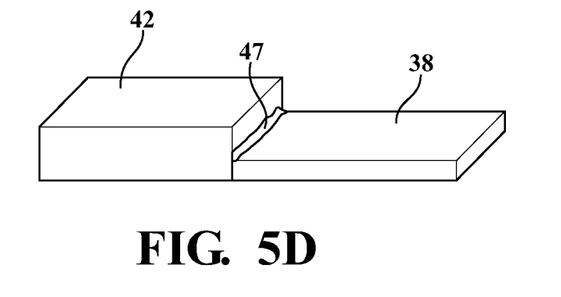
FIG. 5D is a perspective view of the first and second blanks of FIG. 5A after a welding operation.
Figure 6A:
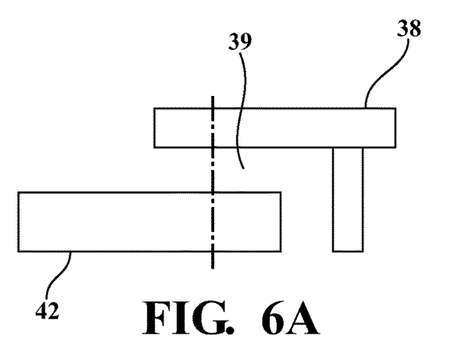
FIG. 6A is a side view of first and second blanks, with the second blank overlying the first blank and vertically spaced from the first blank.
Figure 6B:
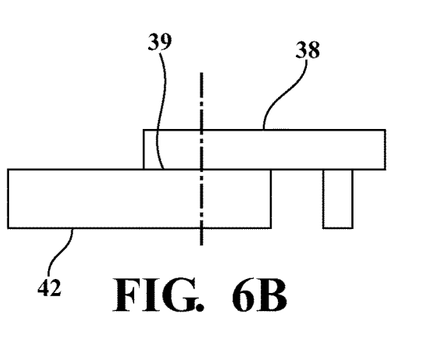
FIG. 6B is a side view of the first and second blanks, with the second blank overlying and vertically engaging the first blank.

As shown in FIGS. 2B and 5A, the method continues with vertically moving the moveable block 40 with the vertical actuator 48 to move the second blank 38 into a first vertical position. According to the example shown in FIG. 2B, a bottom surface of the first blank 38 engages a top surface of the second blank 42 when the second blank is in the first vertical position. However, as illustrated in FIGS. 6A-6B, a vertical gap between the bottom surface of the first blank 38 and the top surface of the second blank 42 may be selected depending on specific requirements. For example, a predetermined vertical gap may be selected to avoid micro-welding between either of the first and second blanks 38, 42 and scraps that result from a subsequent shearing operation (discussed in further detail below). Although not shown in FIGS. 5A-5D, the method may further include horizontally moving the moveable block 40 with the horizontal actuator 50 to provide a desired amount of horizontal overlap between the first and second blanks 38, 42. As shown in FIG. 3, the method may further include rotating the rotating frame 24 about the axis A in order to allow scraps to fall from the first and second blanks 38, 42 during the subsequent shearing operation, and/or to allow bottom surfaces of the first and second blanks 38, 42 to be welded.

Figure 5B:
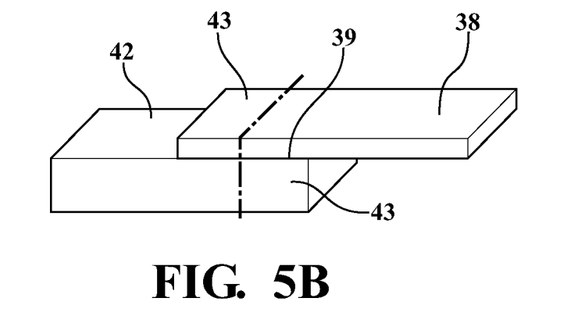
FIG. 5B is a perspective view of the first and second blanks of FIG. 5A during a shearing operation.

As shown in FIG. 5B, the method continues with vertically shearing the first and second blanks 38, 42 in the region in which the second blank 42 overlies the first blank 38. As previously noted, the shearing may be provided by a laser cutter, however other shearing methods may be utilized. In the event that a laser cutter is employed, the thinner (in the vertical direction) of the first and second blanks 38, 42 faces the laser shearing beam. As shown, by shearing the first and second blanks 38, 42, two segments of scrap 43 will break from the first and second blanks 38, 42 after shearing. As previously noted, in the event that the rotatable rotating frame 24 is angled relative to the base frame 12, the scraps 43 can automatically fall due to gravity.

Figure 3B:
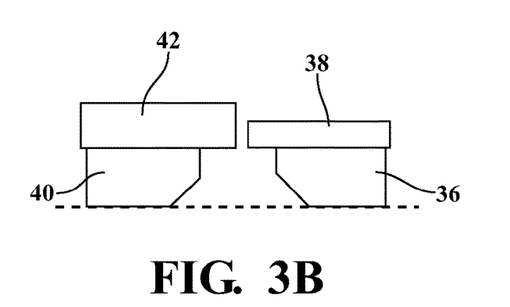
FIG. 3B is a side view of the blanks of FIG. 3A after the shearing operation and with bottom surfaces of the blanks vertically aligned with one another after vertical movement of the moveable block.
Figure 3C:
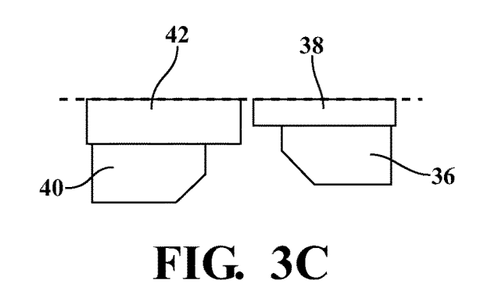
FIG. 3C is a side view of the blanks of FIG. 3A after the shearing operation with top surfaces of the blanks vertically aligned with one another after vertical movement of the moveable block.
Figure 5C:
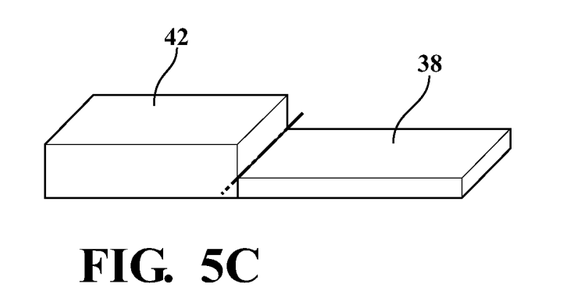
FIG. 5C is a perspective view of the first and second blanks of FIG. 5A, with edges of the first and second blanks engaging each other prior to a welding operation.
Figure 9:
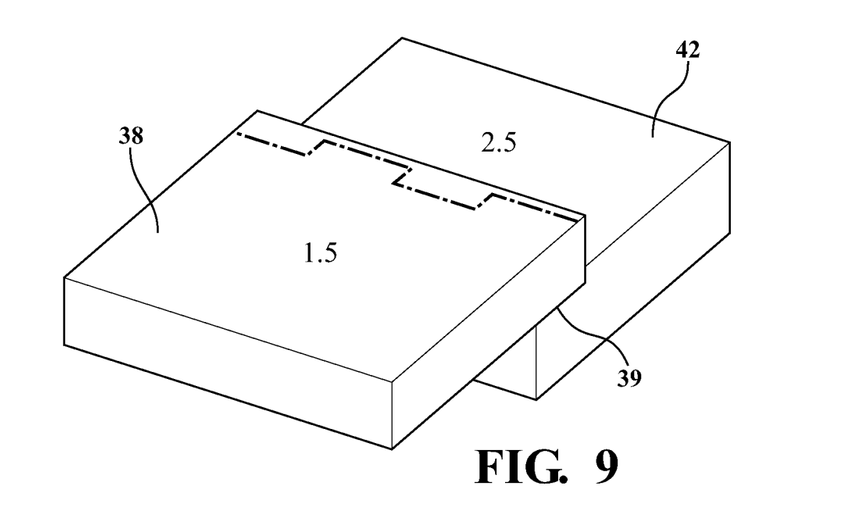
FIG. 9 is a perspective view of first and second blanks in an overlying arrangement, illustrating that the first and second blanks may be sheared in various patterns.

As shown in FIG. 5C, the method continues with vertically moving the moveable block 40 to locate the second blank 42 to a second vertical position relative to the first blank 38, wherein the second blank 42 is at least partially vertically aligned with the first blank 38 at an intersection region. For example, as shown in FIG. 3B, the moveable block 40 may be moved with the vertical actuator 48 such that a bottom surface of the second blank 42 lies flush with a bottom surface of the first blank 38. Alternatively, as shown in FIG. 3C, the moveable block 40 may be vertically moved with the vertical actuator 48 such that top surfaces of the first and second blanks 38, 42 are located flush with one another. As shown, because the first and second blanks 38, 42 were sheared while overlying one another, a substantially flush union between the first and second blanks 38, 42 may be provided, thereby eliminating the need for filler materials between the blanks, even when the blanks have dimensional imperfections or are not clamped in perfect alignment. As illustrated in FIG. 9, the first and second blanks 38, 42 may be sheared during this step in various patterns, e.g., a wave, zig-zag, while still providing a substantially flush union between the first and second blanks after shearing.

Figure 3D:
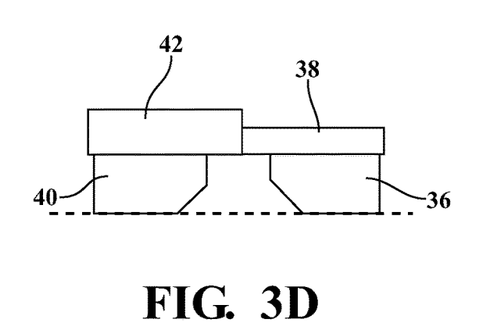
FIG. 3D is a side view of the blanks of FIG. 3B after horizontal movement of the moveable block.
Figure 3E:
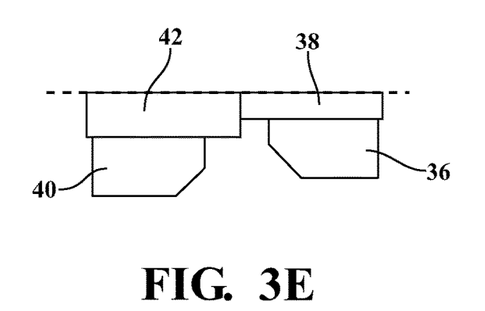
FIG. 3E is a side view of the blanks of FIG. 3C after horizontal movement of the moveable block.

As shown in FIGS. 3D-3E, the method may continue with horizontally moving the moveable block 40 relative to the fixed block 36 with the horizontal actuator 50 to close any horizontal gap that is present between the first and second blanks 38, 42. As shown in FIGS. 5C and 5D, the method proceeds with welding the second blank 42 to the first blank 38 at a butt joint/the intersection region between the first and second blanks 38, 42 to create a weld 47.

As shown in FIGS. 4A and 4B, prior to welding, the rotating frame 24 may be rotated anywhere between approximately 0 and 90 degrees from its horizontal position to allow the weld to be located along top surfaces of the first and second blanks 38, 42, such that the weld is located vertically opposite a burr that results from shearing the first and second blanks 38, 42. Alternatively, the rotating frame 24 may be rotated anywhere between approximately 90 and 180 degrees to allow the weld to be located along bottom surfaces of the first and second blanks 38, 42 such that the weld may be located along the burr in order to allow the burr material to be used as additional material to provide a smoother slop along the weld. This is contrary to prior art fixture assemblies which often require excess burrs to be removed after trimming. In the event that the weld is to be located along the bottom surfaces of the first and second blanks 38, 42, the thinner blank may be located on the moveable block 40 and the thicker blank may be located on the fixed block 36. After the first and second blanks 38, 42 are welded to one another, the method continues with returning the rotating frame 24 to its original, horizontal position, disconnecting the first and second clamps 44, 46, and removing the first and second blanks 38, 42 from the fixture assembly 10.

Variations of the aforementioned method may be employed for different welding scenarios. For example, the steps of shearing and welding may occur with the rotating frame 24 in the range of 0 to 90 degrees. According to another example, both shearing and welding may occur with the rotating frame 24 rotated in the range of 90 to 180 degrees. According to another example, the step of shearing may occur with the rotating frame 24 rotated between 0 and 90 degrees, and the welding step may occur with the rotating frame 24 rotated between 90 and 180 degrees. Finally, according to another example, the step of shearing may occur with the rotating frame 24 rotated between 90 and 180 degrees and the step of welding may with the rotating frame 24 rotated between 0 and 90 degrees.

Figure 7A:
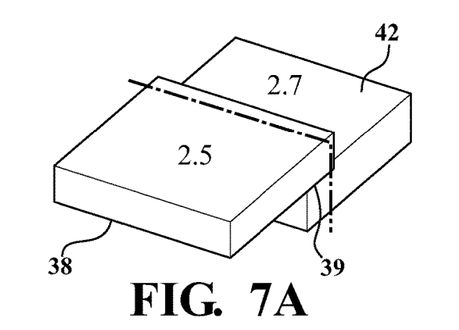
FIG. 7A is a perspective view of a first and second blank, with the second blank overlying the first blank during a first shearing step.
Figure 7B:
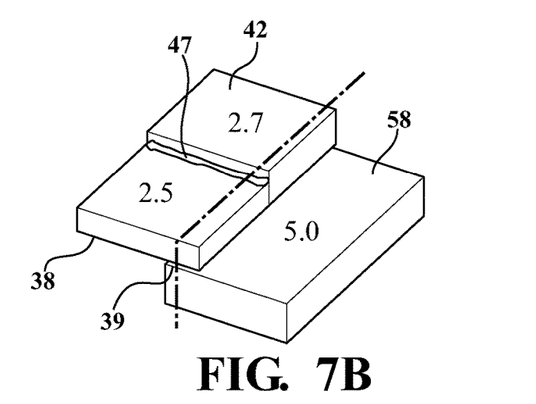
FIG. 7B is a perspective view of the first and second blanks of FIG. 7A, and a third blank, with the first and second blanks overlying the third blank during a second shearing step.
Figure 7C:
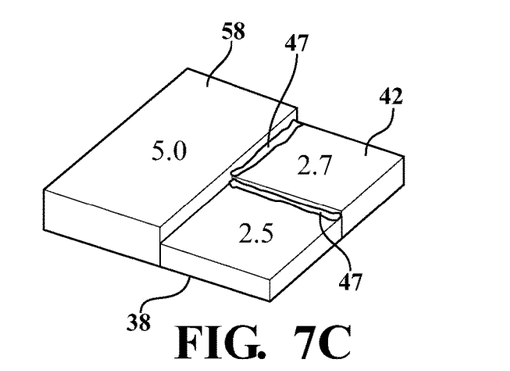
FIG. 7C is a perspective view of the first, second and third blanks of FIG. 7B after being welded to one another.

Because of the adjustability provided by the rotating frame 24, vertical and horizontal actuators 48, 50 and clamps 44, 46, multiple shearing and welding sequences are possible, thus providing significant flexibility in welding operations. FIGS. 7A-7C show such a multiple shearing and welding operation. As shown in FIG. 7A, the method includes arranging the first and second blanks 38, 42 such that the first blank 38 overlies the second blank 42. As further shown in FIG. 7A, the method further includes shearing the first and second blanks 38, 42 along the overlapping region. As shown in FIG. 7B, the method continues with vertically moving the moveable block 40 with the vertical actuator 48 such that the bottom faces of the first and second blocks 38, 42 are aligned flush with one another. As further shown in FIG. 7B, the method continues with aligning a third blank 58 such that it underlies an edge of the first and second blanks 38, 42. As further shown in FIG. 7B, the method proceeds with shearing the first, second and third blanks 38, 42, 58 along the region of the first and second blanks 38, 42 that overlies the third blank 58. As shown in FIG. 7C, the method continues with vertically moving the third blank 58 with the vertical actuator 48 such that its bottom surface is aligned with bottom surfaces of the first and second blanks 38, 42.

Figure 8A:
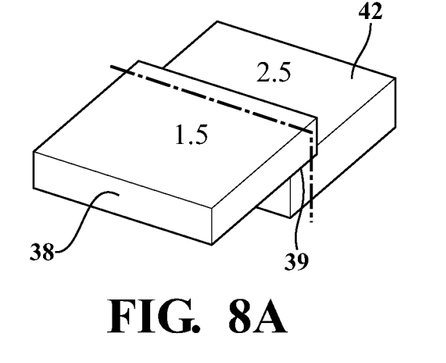
FIG. 8A is a perspective view of first and second blanks, with the first blank overlying the second blank, and illustrating shearing of the first and second banks across the overlying region.
Figure 8B:
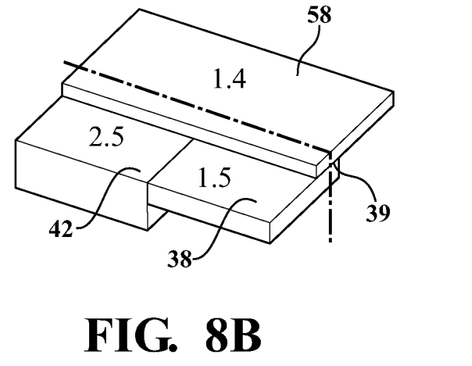
FIG. 8B is a perspective view of a third blank overlying the first and second blanks of FIG. 8A, with the first, second and third blanks in an inverted position, and illustrating shearing of the first, second and third blanks across the overlying region of the third blank.
Figure 8C:
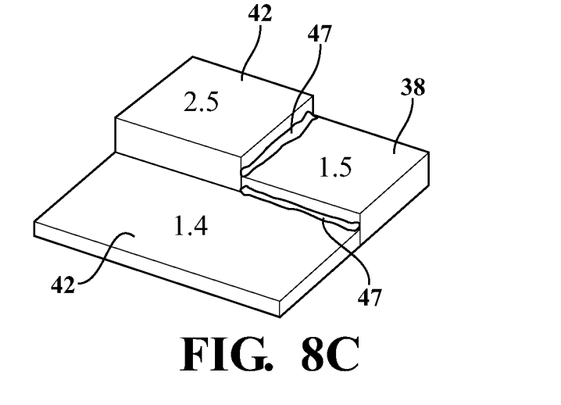
FIG. 8C is a perspective view of the first, second and third blanks of FIG. 8B, with the blanks rotated into an upright position for being welded to one another.

FIGS. 8A-8C illustrate a similar method as FIGS. 7A-7C but further include the step of rotating the rotating frame 135 degrees (from an original 45 degrees position) prior to shearing such that shearing starts at the bottom surface of the blanks (illustrated in FIG. 8B). FIG. 8C illustrated the step of rotating the frame 90 degrees back to a 45 degree position and welding along a burred edge along the top surfaces of the blanks resulting from shearing of the first, second and third blanks.

In view of the foregoing, the subject fixture assembly 10 is advantageously able to secure the blanks 38, 42 to the fixed and moveable blocks 36, 40 and move the moveable block 40 with the rotating frame 24 and vertical and horizontal actuators 48, 50 as needed during shearing and welding operations with only a single clamping action from the first and second clamps 44, 46. Because only a single clamping action is required, the blanks 38, 42 are able to be welded at a butt joint immediately after shearing without a position change after shearing, with no position changes required.

Accordingly, decreased cycle times may be provided, as the blanks 38, 42 do not need to be released from the clamps 44, 46 to manipulate their positions. Furthermore, a reduced mass of the final products, especially in multi-gauge, complex products can be provided, as the blanks 38, 42 can conveniently be sheared into smaller segments in various ways while being supported by the single clamping action of the first and second clamps 44, 46. This is possible with inexpensive materials, such as steel. Furthermore, improved edge quality can be provided on the blanks 38, 42 prior to welding because the blanks 38, 42 can be sheared while overlying one another, and subsequently vertically moved to align the edges with one another, thereby providing a substantially flush union between the blanks 38, 42, thereby eliminating the need for filler materials between the blanks 38, 42, even when the blanks 38, 42 have dimensional imperfections, or are not clamped in perfect alignment. Because the first and second blanks 38, 42 may be sheared while overlying one another, a substantially flush union between the first and second blanks 38, 42 may be provided, thereby eliminating the need for filler materials between the blanks, even when the blanks have dimensional imperfections or are not clamped in perfect alignment. As illustrated in FIG. 9, the first and second blanks 38, 42 may be sheared in various patterns, e.g., a wave, zig-zag, while still providing a substantially flush union between the first and second blanks after shearing. Such precise alignments also provide low tensions at resulting weld seams 47. Furthermore, because the rotating frame 24 can be rotated, the weld can be located along a burr edge after the blanks 38, 42 are sheared, thus utilizing the burr material to provide a smoother weld slope.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:
1. A fixture assembly for supporting a plurality of blanks during a shearing and welding operation, the fixture assembly comprising:
 a base frame;
 a rotating frame rotatably connected to the base frame;

a fixed block fixed to the rotating frame for supporting a first blank of the plurality of blanks;

a moveable block moveably connected to the rotating frame for supporting a second blank of the plurality of blanks;

at least one first clamp for coupling the first blank to the fixed block;

at least one second clamp for coupling the second blank to the moveable block;

a vertical actuator coupled with the rotating frame and configured to move the moveable block in a vertical direction being perpendicular to a plane of the rotating frame for moving the second blank into a desired vertical position; and a horizontal actuator coupled with the rotating frame and configured to move the moveable block in a horizontal direction being perpendicular to the vertical direction for moving the second blank into a desired horizontal position.

2. The fixture assembly as set forth in claim 1 wherein the first and second blocks are magnetic for drawing the first and second blanks thereto.

3. The fixture assembly as set forth in claim 1 wherein the at least one first clamp includes a pair of first clamps and wherein the at least one second clamp includes a pair of second clamps.

4. The fixture assembly as set forth in claim 1 wherein a pressure sensor is configured to detect a pressure of the horizontal and vertical actuators against the moveable block in order to monitor locations of the first and second blanks.

5. The fixture assembly as set forth in claim 1 further including a rotation actuator configured to rotate the rotating frame relative to the base frame, and a controller electrically connected to the vertical, horizontal and rotational actuators for controlling actuation of the vertical, horizontal and rotational actuators.

6. A method for supporting and locating a plurality of blanks during a shearing and welding operation with a fixture assembly, the method comprising:

coupling a first blank of the plurality of blanks to a fixed block of the fixture assembly;

coupling a second blank of the plurality of blanks to a moveable block of the fixture assembly;

moving the moveable block with a vertical actuator such that the second blank is in a first vertical position in which the second blank is vertically above the first blank;

moving the moveable block with a horizontal actuator such that the second blank is in a first horizontal position in which the first blank horizontally overlies the second blank along an overlying region;

shearing the first and second blanks along the overlying region such that an edge of the first blank is horizontally aligned with an edge of the second blank;

vertically moving the moveable block with the vertical actuator such that the first blank is at least partially vertically aligned with the second blank at an intersection region; and welding the first blank to the second blank at the intersection region.

7. The method of claim 6 wherein the second blank vertically engages the first blank when the second blank is in the first vertical position.

8. The method of claim 6 wherein the second blank is vertically spaced from the first blank when the second blank is in the first vertical position.

9. The method of claim 6 further including rotating the moveable and fixed blocks with a rotating frame of the fixture assembly prior to shearing the first and second blanks such that bottom surfaces of the first and second blocks may be sheared, and wherein shearing the first and second blanks includes shearing the bottom surfaces of the first and second blanks along the overlying region to create a burr along a top surface of at least one of the first and second blanks, and wherein welding the first and second blanks includes welding along the burr.

10. The method of claim 6 wherein shearing the first and second blanks includes shearing a top surface of the first and second blanks along the overlying region to create a burr along the bottom surface of at least one of the first and second blanks, and wherein welding the first and second blanks includes welding along the top surface of at least one of the first and second blanks opposite the burr.

11. The method of claim 6 wherein shearing the first and second blanks includes shearing in at least one of a wave pattern, a zig-zag pattern and a linear pattern.

12. The method of claim 6 further including coupling a third block to one of the moveable and fixed blocks of the fixture assembly, wherein moving the moveable block with the horizontal actuator includes horizontally aligning the first, second and third blanks along the overlying region, and wherein shearing the first and second blanks further includes shearing the third blank along the overlying region.

13. The method of claim 12 wherein vertically moving the moveable block includes creating a vertical gap between at least two of the first, second and third blanks.

14. The method of claim 12 wherein vertically moving the moveable block includes vertically engaging the first and second blocks to one another, and vertically engaging the second and third blocks to one another.

15. The method of claim 6 wherein moving the moveable block with the vertical actuator and the horizontal actuator includes activating the vertical actuator and the horizontal actuator with a control system.

16. The fixture assembly as set forth in claim 1 wherein the vertical actuator and the horizontal actuator are each pneumatic cylinders.

17. The fixture assembly as set forth in claim 1 further including a laser cutter for shearing the blanks.

18. The fixture assembly as set forth in claim 1 further including a laser welder for welding the blanks.

19. The fixture assembly as set forth in claim 1 wherein the base frame includes a pair of end members being generally parallel with one another, and a pair of support members each extending upwardly from one of the end members, and wherein the rotating frame is rotatably supported between the support members.

20. The fixture assembly as set forth in claim 19 wherein the rotating frame includes a pair of outside members each rotatably coupled to one of the support members along an axis.

* * * * *